(12) United States Patent
Brassil et al.

(10) Patent No.: US 9,408,025 B2
(45) Date of Patent: Aug. 2, 2016

(54) AUTHENTICATING A USER'S LOCATION IN A FEMTOCELL-BASED NETWORK

(75) Inventors: John T. Brassil, Belle Mead, NJ (US); Stuart Haber, New York, NY (US); Pratyusa Kumar Manadhata, Piscataway, NJ (US); Ravi Arun Netravali, Westfield, NJ (US); Prasad V Rao, Metuchen, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/347,394

(22) PCT Filed: Oct. 11, 2011

(86) PCT No.: PCT/US2011/055761
§ 371 (c)(1),
(2), (4) Date: Mar. 26, 2014

(87) PCT Pub. No.: WO2013/055319
PCT Pub. Date: Apr. 18, 2013

(65) Prior Publication Data
US 2014/0213293 A1     Jul. 31, 2014

(51) Int. Cl.
*H04W 24/00*     (2009.01)
*H04W 4/02*     (2009.01)
*H04W 4/04*     (2009.01)
*H04W 12/10*     (2009.01)
*H04W 12/06*     (2009.01)
*H04W 84/04*     (2009.01)

(52) U.S. Cl.
CPC ............... *H04W 4/02* (2013.01); *H04W 4/043* (2013.01); *H04W 12/10* (2013.01); *H04W 12/06* (2013.01); *H04W 84/045* (2013.01)

(58) Field of Classification Search
CPC ..... H04W 4/02; H04W 64/00; H04W 84/045; G01S 5/0257
USPC ................................. 455/404, 2, 456.1–456.6
See application file for complete search history.

(56) References Cited

U.S. PATENT DOCUMENTS

| 8,064,909 | B2 | 11/2011 | Spinelli et al. | |
| 2008/0112551 | A1* | 5/2008 | Forbes | H04M 3/42042 379/142.1 |
| 2008/0227462 | A1* | 9/2008 | Freyman et al. | 455/456.1 |

(Continued)

FOREIGN PATENT DOCUMENTS

WO    WO-2005/041040 A1    5/2005

OTHER PUBLICATIONS

Borgaonkar, R. et al., "Experimental Analysis of the Femtocell Location Verification Techniques" Oct. 27-30, 2010.

(Continued)

*Primary Examiner* — Mazda Sabouri
*Assistant Examiner* — Edward Zhang
(74) *Attorney, Agent, or Firm* — Hewlett Packard Enterprise Patent Department

(57) ABSTRACT

A method for authenticating a user's location in a femtocell-based network is disclosed. A user is associated to a femtocell connected to a connection point in the wireless network. An indication of the user's location is provided to a remote user. A characteristic of a connection between the femtocell and the connection point is monitored. The monitored characteristic is provided to the remote user to verify user's location.

20 Claims, 7 Drawing Sheets

(56) References Cited

U.S. PATENT DOCUMENTS

| | | | |
|---|---|---|---|
| 2008/0279093 A1* | 11/2008 | Hassan et al. | 370/216 |
| 2010/0087166 A1 | 4/2010 | Agashe | |
| 2011/0053609 A1 | 3/2011 | Choi-Grogan | |
| 2011/0081919 A1* | 4/2011 | Das et al. | 455/456.1 |
| 2011/0249658 A1* | 10/2011 | Wohlert | H04W 4/04 370/338 |
| 2011/0267977 A1 | 11/2011 | Doppler et al. | |
| 2012/0021736 A1 | 1/2012 | Miyagawa et al. | |
| 2012/0046014 A1 | 2/2012 | Wachter et al. | |

OTHER PUBLICATIONS

"Wi-Fi Positioning System," Wikipedia, the free encyclopedia, Sep. 10, 2011, pp. 1-2.

Extended European Search Report, EP Application No. 11874065.3, Date: Mar. 16, 2015, pp. 1-9.

Karen Kent Frederick, "Network Instrusion Detection Signatures, Part one Symantec Connect," Dec. 19, 2001, pp. 1-6.

\* cited by examiner

AUTHENTICATING A USER'S LOCATION IN A FEMTOCELL-BASED NETWORK

BACKGROUND

Wireless communication networks have become increasingly popular. In such networks, electronic devices such as notebook computers, handheld computers, personal digital assistants, phones and the like can access a network via a wireless communications link. The wireless link may be connected to a wired network through an Access Point ("AP") using Wi-Fi, Bluetooth, or other wireless standards. This enables users to access the Internet and other networks from anywhere within an AP's range, thereby providing seamless mobile connectivity to applications, services, devices, and data.

One of the key features of this seamless mobile connectivity is the ability to locate a device or a user within a wireless network. Location-Based Services ("LBS") have emerged as a way to enhance targeted services, applications, and advertising delivery to users. These services allow a wireless service provider to receive location information for a user and exploit the location (such as by monetizing it) to offer highly customizable content to users. Examples of LBS include enhanced 911 ("E-911"), location-based 411, location-based messaging and/or friend finding, requesting the nearest business or service (e.g., restaurant or gas station), receiving location-based reports (e.g., weather, traffic, local news and events), location-based games, location-based advertisements and discounts, and so on.

A drawback of the growing use of LBS is that they incent users to report false locations (for example, to receive additional discounts). They also may be limited to service subscribers and require that participation be established before a first use. Third-party companies (such as Groupon or Foursquare) may be involved to provide the subscription service. Privacy and security concerns also abound. In typical LBS, it is a device—rather a user—that is located, with often unauthenticated location coordinates (e.g., Global Positioning Systems ("GPS") coordinates) that may be unavailable if the user's device is indoors. Although LBS are ubiquitous and cheap, these limitations should be avoided if LBS are to continue their prevalence in wireless networks.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
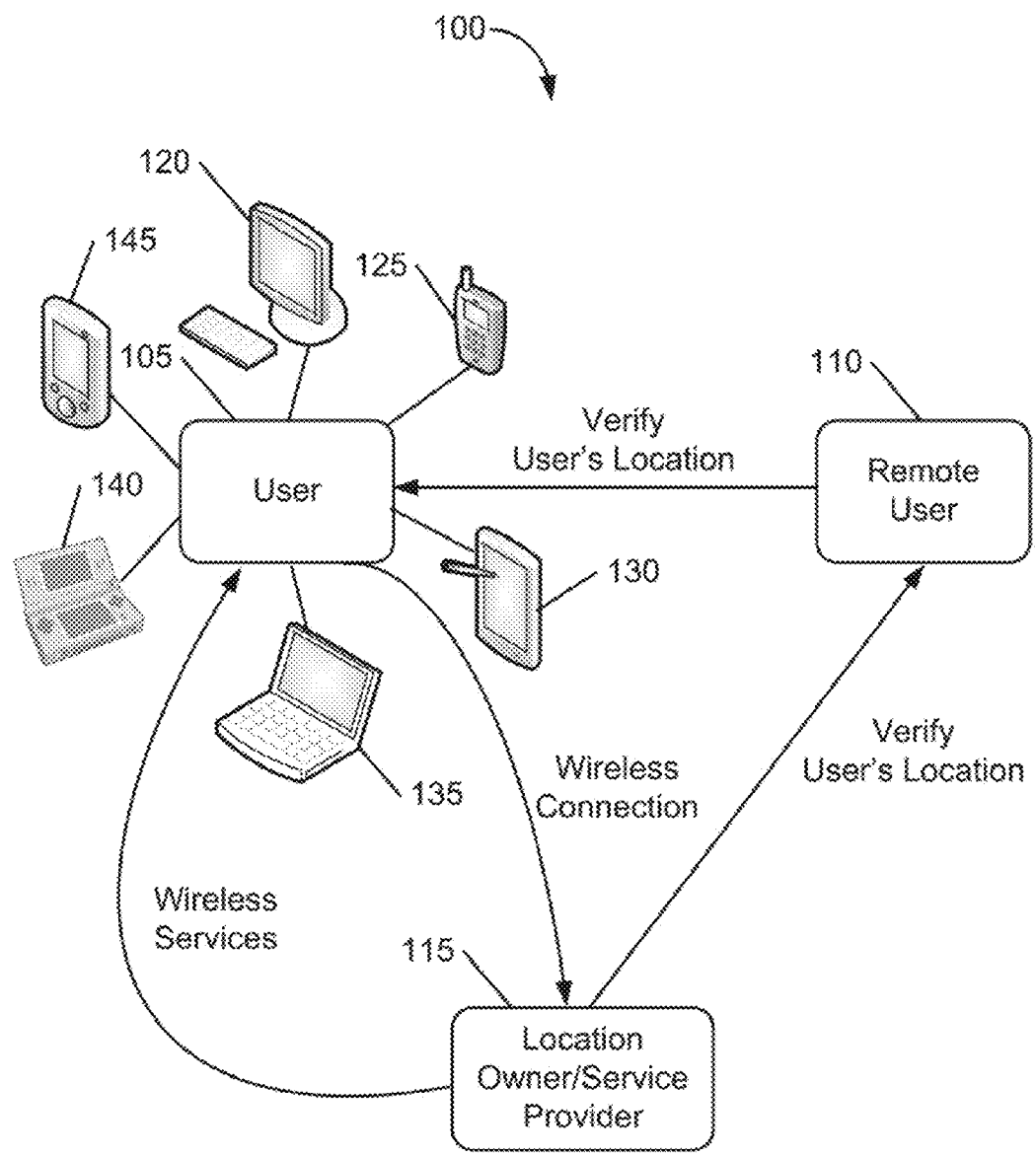
FIG. 1 is a schematic diagram illustrating parties in a network capable of providing location-based services.

A method and non-transitory computer readable medium for authenticating a user's location in a femtocell-based network are disclosed. As generally described herein, a femtocell is a small cellular base station that connects to a wireless service provider's network to provide extended wireless coverage to a group of users within the femtocell's range, typically within 5 to 100 meters. The femtocell may connect to the network via a Connection Point ("CP"), which enables wireless devices in the network to connect to a wired network using Wi-Fi, Bluetooth, or other wireless standards. The CP can be, for example, an Access Point ("AP"), a router, or other such device for connecting the femtocell to the network. The wireless devices in the network may include any electronic device capable of connecting to the network via a wireless communications link, such as, for example, desktop computers, notebook computers, handheld computers, personal digital assistants, phones, smart phones, game devices, and the like.

In various embodiments, a remote user can authenticate the location of a user associated with the femtocell in the network. The user whose location is desired to be authenticated binds to the femtocell and provides an indication of his/her location to the remote user. The indication may be, for example, an identification code, a physical address, a URL, or any other indication that uniquely identifies the user's location to the remote user. The user may provide the indication to the remote user by, for example, calling the remote user, sending a text message to the remote user, sending an e-mail to the remote user, or using an other communication means.

The indication of the user's location enables the remote user to access a location module associated with the femtocell. The remote user accesses the location module, such as, the example, by connecting to a URL associated with the location module. The location module monitors one or more characteristics (e.g., bandwidth, throughput, etc.) of a connection between the femtocell and the CP and provides the monitored characteristic(s) to the remote user. The remote user may then engage in a communication with the user (such as by calling the user) and verify the communication in the monitored characteristic(s) to authenticate the user's location. As described in more detail herein below, the communication impresses a unique traffic signature in the monitored characteristic(s) that is only known by the remote user.

It is appreciated that embodiments described herein below may include various components and features. Some of the components and features may be removed and/or modified without departing from a scope of the method and non-transitory computer readable medium for authenticating a user's location in a femtocell-based network. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Referring now to FIG. 1, a schematic diagram illustrating parties in a wireless network capable of providing location-based services is described. Wireless network 100 is a wireless network that provides wireless services to multiple parties, including user 105, remote user 110 and location owner/service provider 115. User 105 may be a person whose location is desired to be known and authenticated by remote user 110. The user 105 may access the wireless network 100 using any electronic device capable of connecting to the network 100 via a wireless communications link, such as, for example, desktop computer 120, phone 125, tablet 130, notebook computer 135, gaming device 140, and smart phone 145, among others. The remote user 110 may be a person or an organization that would like to verify (possibly willing to pay) the location of the user 105. For example, the remote user 110 may be an employer or business associate of the user 105, the remote user 110 may be a target advertiser or promoter that provides location-based advertisements or promotions to users, or the remote user 110 may be a target service or content provider that provides location-based services and/or content to users, among others.

The user 105 may connect to the wireless network 100 through the location owner/service provider 115. The location owner/service provider 115 may provide wireless services (e.g., Wi-Fi) to users at its place of business, for example, the location owner/service provider 115 may be a coffee shop, bookstore, restaurant, retail store, library, hospital, or other entity running a wireless network for its users. The location owner/service provider 115 does not have any prior relationship with the user 105 or the remote user 110. However, the location owner/service provider 115 may be interested in monetizing LBS to its users, including monetizing a location authentication service. In this case, the location owner/service provider 115 may assist the remote user 110 to authenticate the location of the user 105.

Figure 2:
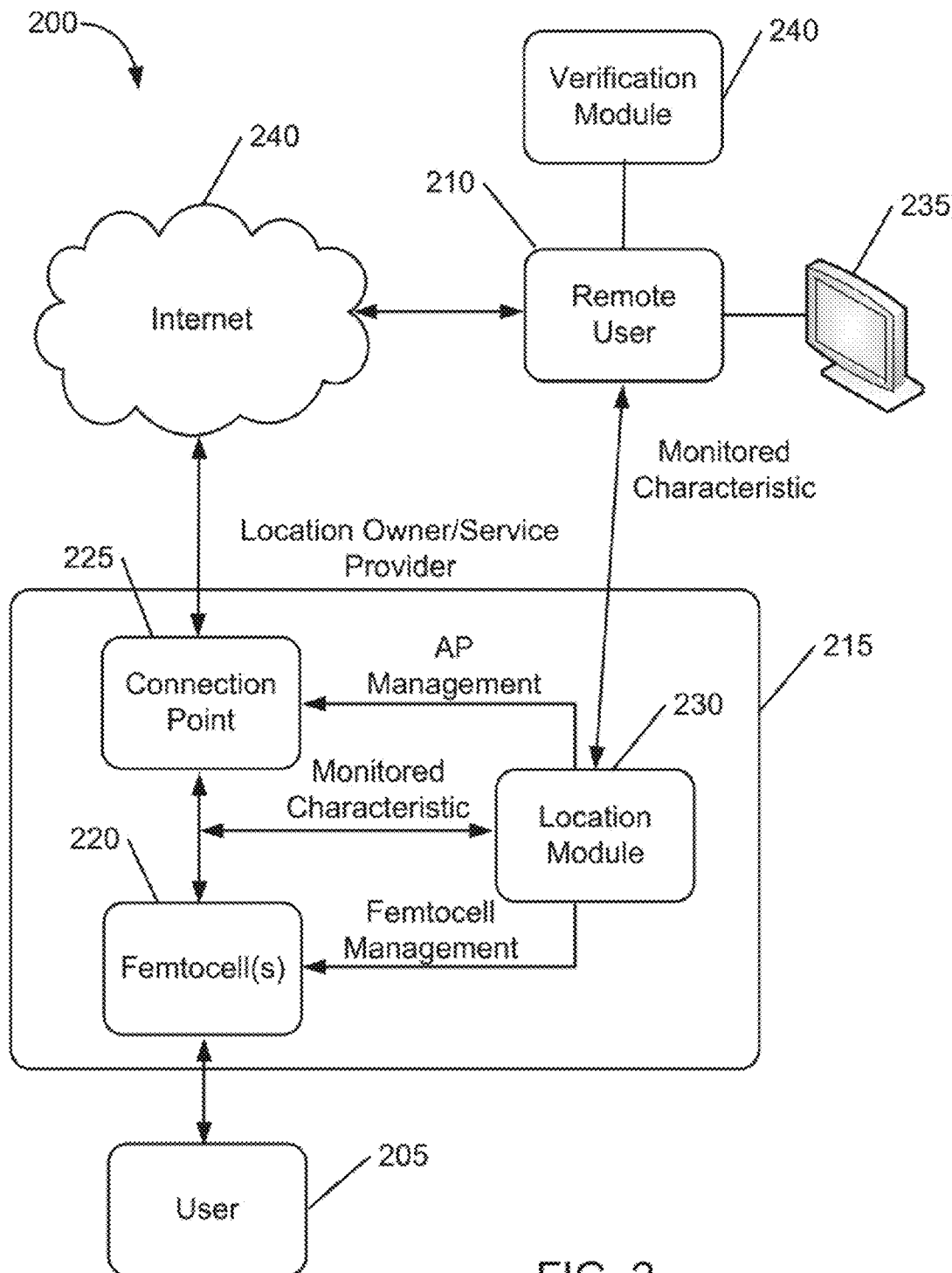
FIG. 2 is a schematic diagram illustrating how a user's location is authenticated in a femtocell-based network in accordance to various embodiments.

Attention is now directed to FIG. 2, which illustrates it schematic diagram showing how a user's location is authenticated in a femtocell-based network in accordance to various embodiments. User 205 is a user whose location is desired to be known and authenticated by remote user 210. The user 205 is located at a place of business owned or provided by the location owner/service provider 215. The location owner/service provider 215 provides user 205 with access to a wireless network and wireless services via one or more femtocell(s) 220 connected to a connection point 225. The femtocell(s) 220 may be associated with a given wireless service provider, such as, for example, AT&T, Verizon, Sprint, and so on. It is appreciated that the location owner/service provider 215 may have multiple femtocells, one for each wireless service provider. It is also appreciated that communications between the user 205 and the remote user 210 may take place through Internet 240, femtocell(s) 220 and connection point 225.

In various embodiments, the location owner/service provider 215 has a location module 230 to assist in the authentication of the user's 205 location. The location module 230 may be, for example, implemented in hardware, software, or to combination, as a separate module or integrated with the femtocell(s) 220 or the connection point 225. The location module 230 monitors one or more characteristics of the connection between the femtocell(s) 220 and the connection point 225, such as for example, the connection bandwidth, throughput, or other such network performance measurement. The location module 230 may also manage features for the femtocell(s) 220 and the connection point 225. It is appreciated that the traffic between the femtocell(s) 220 and the connection point 225 is almost entirely encrypted.

As described in more detail below, the location module 230 provides the monitored characteristic(s) to the remote user 210 so that the remote user 210 can verify the location of the user 205. The user 205 binds to the femtocell(s) 220 and provides an indication of his/her location to the remote user 210. The indication may be, for example, an identification code, a physical address, a URL, or any other indication that uniquely identifies the user's 205 location to the remote user 210 and enables the remote user 210 to access the location module 230. The user 205 may provide the indication to the remote user 210 by, for example, calling the remote user 210, sending is text message to the remote user 210, sending an e-mail to the remote user 210, or using any other communication means.

Upon receiving the indication, the remote user 210 accesses the location module 230, such as, for example, by connecting to a URL associated with the location module 230, to receive the monitored characteristic(s) in a web page, document, or other content relaying mechanism. The remote user 210 may then engage in a communication with the user 205 (such as by calling the user 205) and verify the communication in the monitored characteristic(s) to authenticate the user's 205 location. In one embodiment, the remote user 210 may observe the monitored characteristic(s) in a display device 235. The communication with the user 205 is reflected in a unique traffic signature in the monitored characteristic(s) that is only known by the remote user 210. In another embodiment, a verification module 240 is provided. The verification module 240 receives the monitored characteristic and automatically determines whether it corresponds to the signal sent by the remote user 210 to the user 205.

Figure 3A:
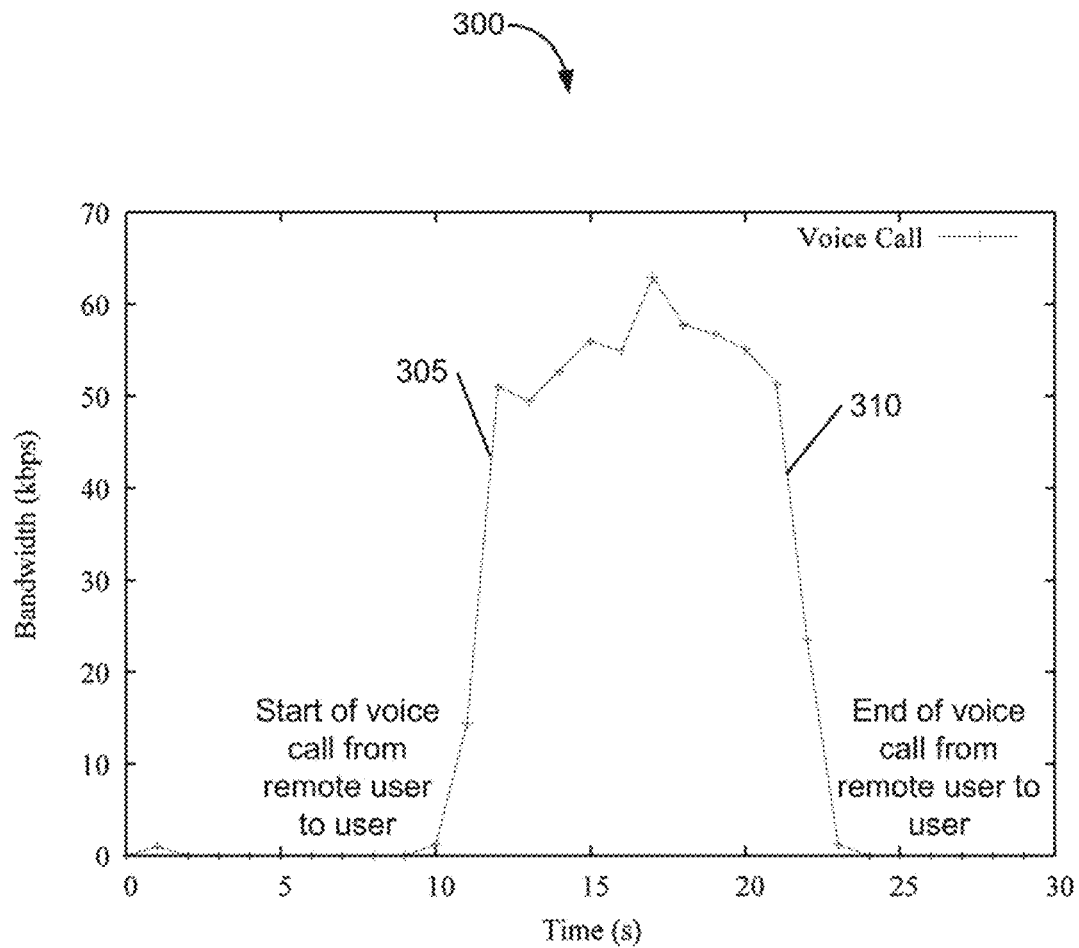
FIG. 3A shows a monitored bandwidth between the femtocell(s) and the connection point of FIG. 2 when a voice call is generated.

For example, FIG. 3A shows a monitored bandwidth between the femtocell(s) 220 and the connection point 225 when a voice call is generated from the remote user 210 to the use 205. The monitored bandwidth may be displayed to the remote user 210 in a graph 300. When the remote user 210 places a call to the user 205 to verify the user's 205 location, the call shows up in the graph 300 as a sudden peak 305 in the bandwidth. The peak 305—on the order of 50-65 kbps—is gone (310) when the remote user 210 disconnects from the call to the user 205. Since the remote user 210 is aware of when the communication to the user 205 is placed (e.g., the remote user 210 knows when a call to the user 205 is placed as the remote user 210 is talking to the user 205), the remote user 210 can verify that the peak 305 in the bandwidth corresponds to the communication to the user 205.

Figure 3B:
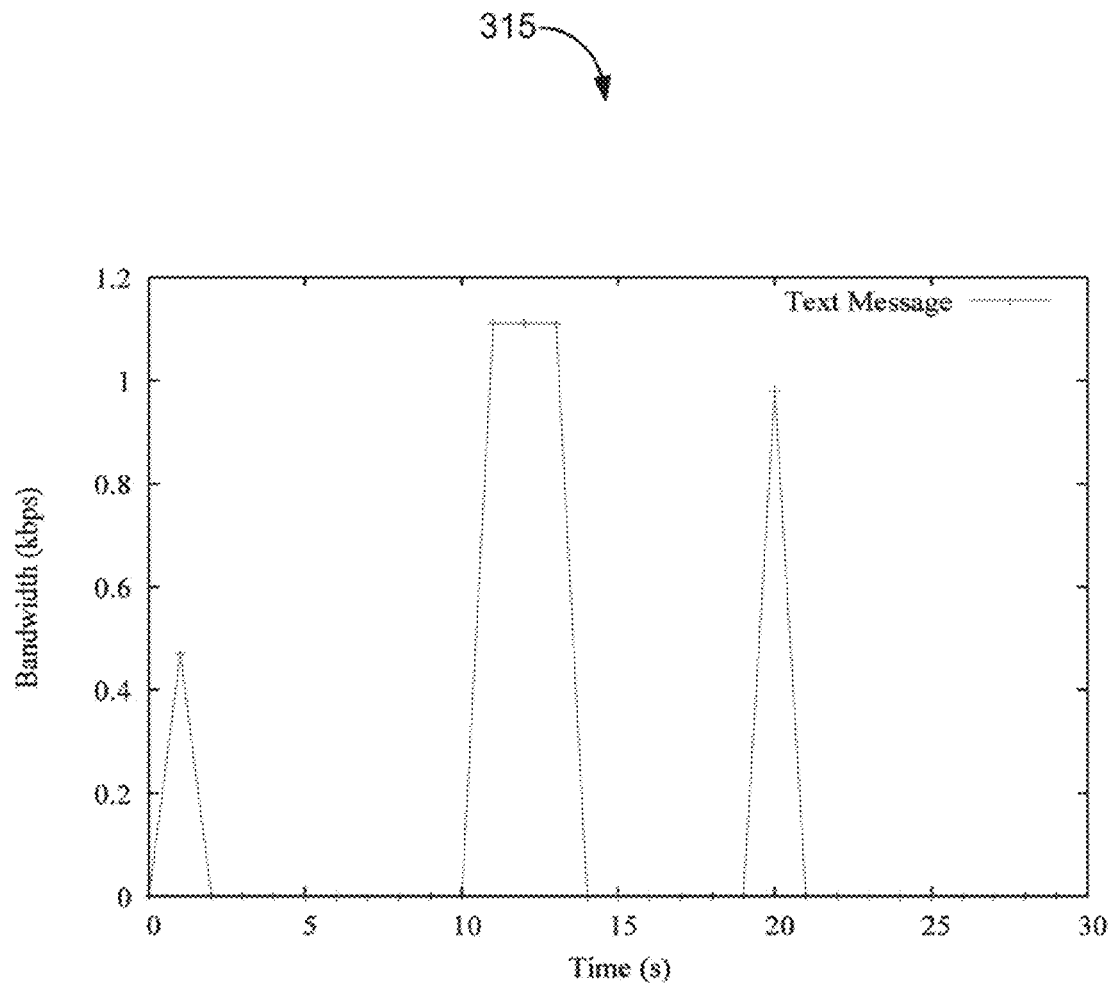
FIG. 3B shows a monitored bandwidth between the femtocell(s) and the connection point of FIG. 2 when a text message is generated.

It is appreciated that by placing a traffic signature on the connection between the femtocell(s) 220 and the connection point 225 such as a voice call or other signal designed to be easily detectable, the remote user 210 is able to detect the traffic signature in the monitored characteristic(s) even in the presence of other traffic, possibly including text messages, other voice calls, and data traffic (e.g., web access). For example, FIG. 3B shows a monitored bandwidth between the femtocell(s) 220 and the connection point 225 when a text message is generated. The text message 315 is bursty and has a low bit rate, with the peak bandwidth only at the order of 1 kbps (in contrast to the 50-65 kbps voice call peak 305 of FIG. 3A). That is, if the remote user 210 places a voice call or another easily detectable traffic signature on the connection between the femtocell(s) 220 and the connection point 225, the remote user 210 would still be able to identify the traffic signature as a signal to the user 205 even in the presence of text messages or other traffic.

In one embodiment, the traffic signature placed on the connection between the femtocell(s) 220 and the connection point 225 by the remote user 210 may be identified in a packet sent to the user 205. The traffic signature may be identified in the packet header, such as for example, by a unique code in a packet header field dedicated to quality of service (e.g., the Differentiated Services Code Point or "DSCP" field). The remote user 210 can ensure that its traffic signature is assigned a higher quality of service than other types of traffic, thereby improving its detection when in presence of other traffic.

It is also appreciated that the traffic signature imposed on the monitored characteristic(s) by the remote user 210 when communicating to the user 205 is only known and can only be identified by the remote user 210 and not by any other party in the network (e.g., including the user 205 and the location owner/service provider 215). The remote user 210 can employ various detection mechanisms to ensure that the traffic signature detection is accurate, such as, for example, by creating an estimated sampled version of the traffic signature and comparing it (e.g., by performing a correlation) to the received traffic signature in the monitored characteristic. Only the remote user 210 knows when and how he/she uses the connection between femtocell(s) 220 and the connection point 225.

It is further appreciated that the user 205 or the location owner/service provider 215 may try to provide false information (e.g., a false depiction of the monitored characteristic(s)) to the remote user 210 to trick the remote user 210 into learning a false location for the user 205. However, because the location owner/service provider 215 has no prior relationship with the remote user 210, the remote user 210 can query the location module 230 at any future time to confirm the authenticity of the user's 205 location. If the remote user 210 does not receive the same information, the remote user 210 can easily invalidate the user 205 or the location owner/service provider 215 attempt to provide a false location to the remote user 210.

In one embodiment, the user 205 can take advantage a features in his/her electronic device to enhance his/her authentication as he/she connects to the network. For example, the user 205 may be using a device (e.g., a smart phone, PDA, laptop, etc.) that is equipped with encryption capabilities and an encryption key as a further authentication measure for the user 205. The user 205 can communicate with the remote user 210 (e.g., such as when providing the remote user 210 the indication of the user's 205 location) using the encryption key to guarantee that the communication is authentic. If messages from the user 205 to the remote user 210 are signed with the user's 205 encryption key, then the remote user 210 knows that he/she is communicating to a device holding the user's 205 key. As understood by one skilled in the art, the presence of a key in the user's 205 device is equivalent to the presence of the key owner (i.e., user 205). In addition, the user 205 can take advantage of other security and privacy features in the connection to the remote user 210 (e.g., security features in Internet 240) to prevent the remote user 210 from learning more about the user 205 other than his/her location.

Figure 4:
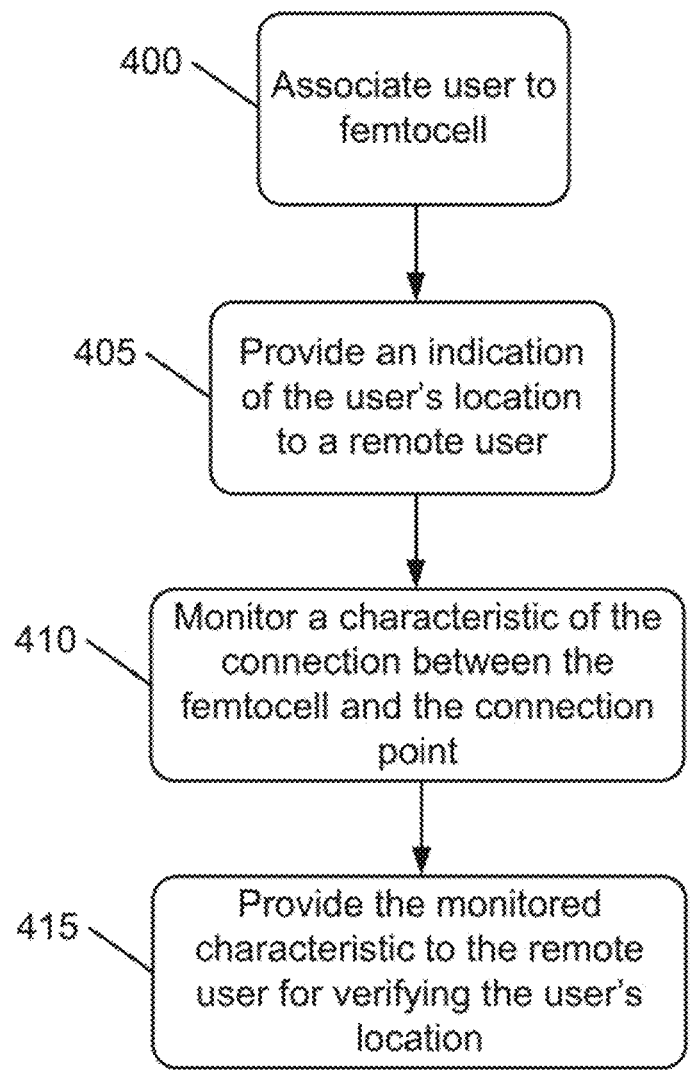
FIG. 4 is a flowchart for authenticating a user's location in a femtocell-based network in accordance to various embodiments.

Referring now to FIG. 4, a flowchart for authenticating a user's location in a femtocell-based network in accordance with various embodiments is described. First, a user whose location is desired to be known and authenticated (e.g., user 205) is associated to a femtocell (e.g., femtocell(s) 220) connected to a connection point (e.g., connection point 225) in the network (400). Next, an indication of the user's location is provided to a remote user, such as remote user 210 (405). The indication, as described above, may be an identification code, a physical address, an URL, or any other indication that uniquely identifies the user's location to the remote user. The user may provide the indication to the remote user by, for example, calling the remote user, sending a text message to the remote user, sending an e-mail to the remote user, or using any other communication means.

A location module associated with the femtocell and the connection point (e.g., location module 230) may then monitor a characteristic of the connection between the femtocell(s) and the connection point (410). Lastly, the monitored characteristic may be provided to the remote user for verifying the user's location (415). The remote user may access the location module 230, such as, for example, by connecting to a URL associated with the location module 230, to receive the monitored characteristic.

Figure 5:
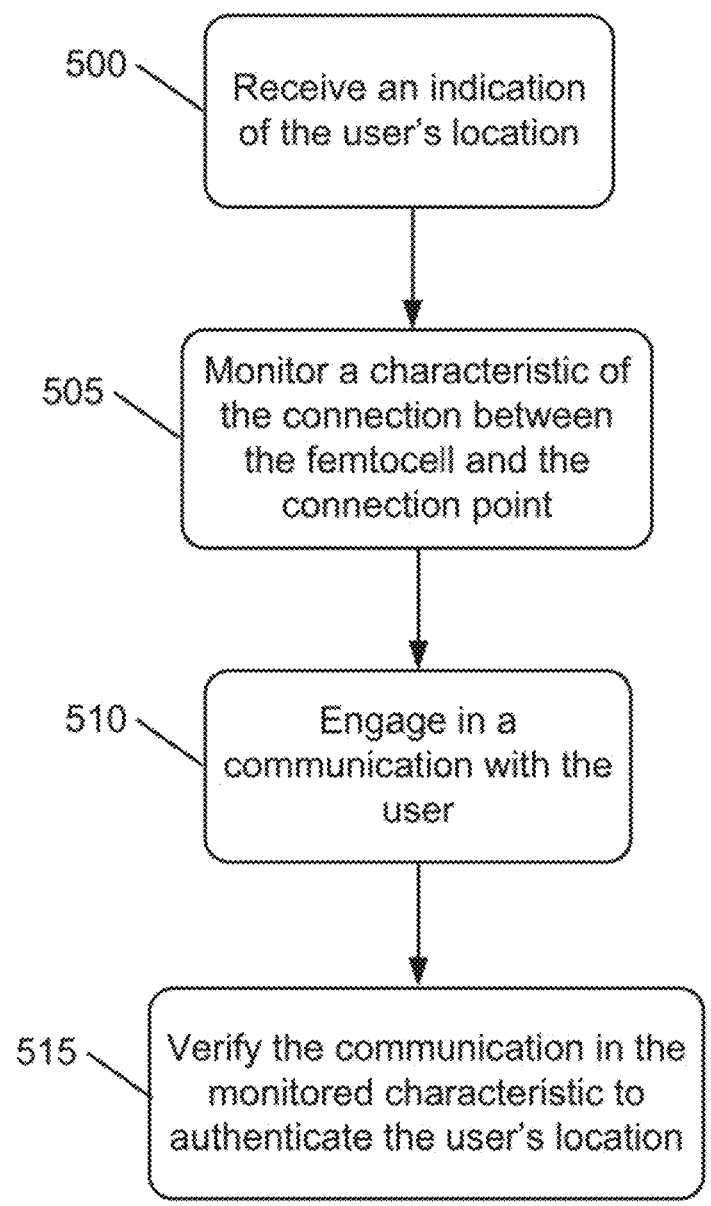
FIG. 5 is a flowchart for a remote user to authenticate a user's location, in a femtocell-based network in accordance to various embodiments.

Attention is now directed to FIG. 5, which shows a flowchart for a remote user to authenticate a user's location in a femtocell-based network in accordance with various embodiments. First, the remote user receives an indication of the user's location associated with a femtocell connected to a connection point in the network (500). Next, the remote user monitors a characteristic of a connection between the femtocell and the connection point (505). The remote user may then engage in a communication with the user (510) and verify the communication in the monitored characteristic to authenticate the user's location (515). In one embodiment, the remote user may observe the monitored characteristic in a display device (e.g., display device 235). The communication with the user is reflected in a unique traffic signature in the monitored characteristic that is only known by the remote user. In another embodiment, a verification module 240 is provided. The verification module 240 receives the monitored characteristic and automatically determines whether it corresponds to the signal sent by the remote user 210 to the user 205.

Advantageously, the location authentication described above is spontaneous, that is, no prior location service activation is required. Neither the user nor the remote user need any pre-existing relationship with the participating location owner/service provider. The location authentication is also transaction-oriented rather than subscription-oriented (common with currently available LBS), which means that a one-time authentication or sign-in is not required. Further, the location authentication can be trusted and is collusion-resistant. The location authentication is also private, as the user may opt-in to the service on a per-use basis and the location owner/service provider binds to the transactions in the network rather than to individual user records. Location owner/service providers may deploy this location authentication service either indoors or outdoors and offer fine-grain location information to users that is device and wireless carrier independent.

Figure 6:
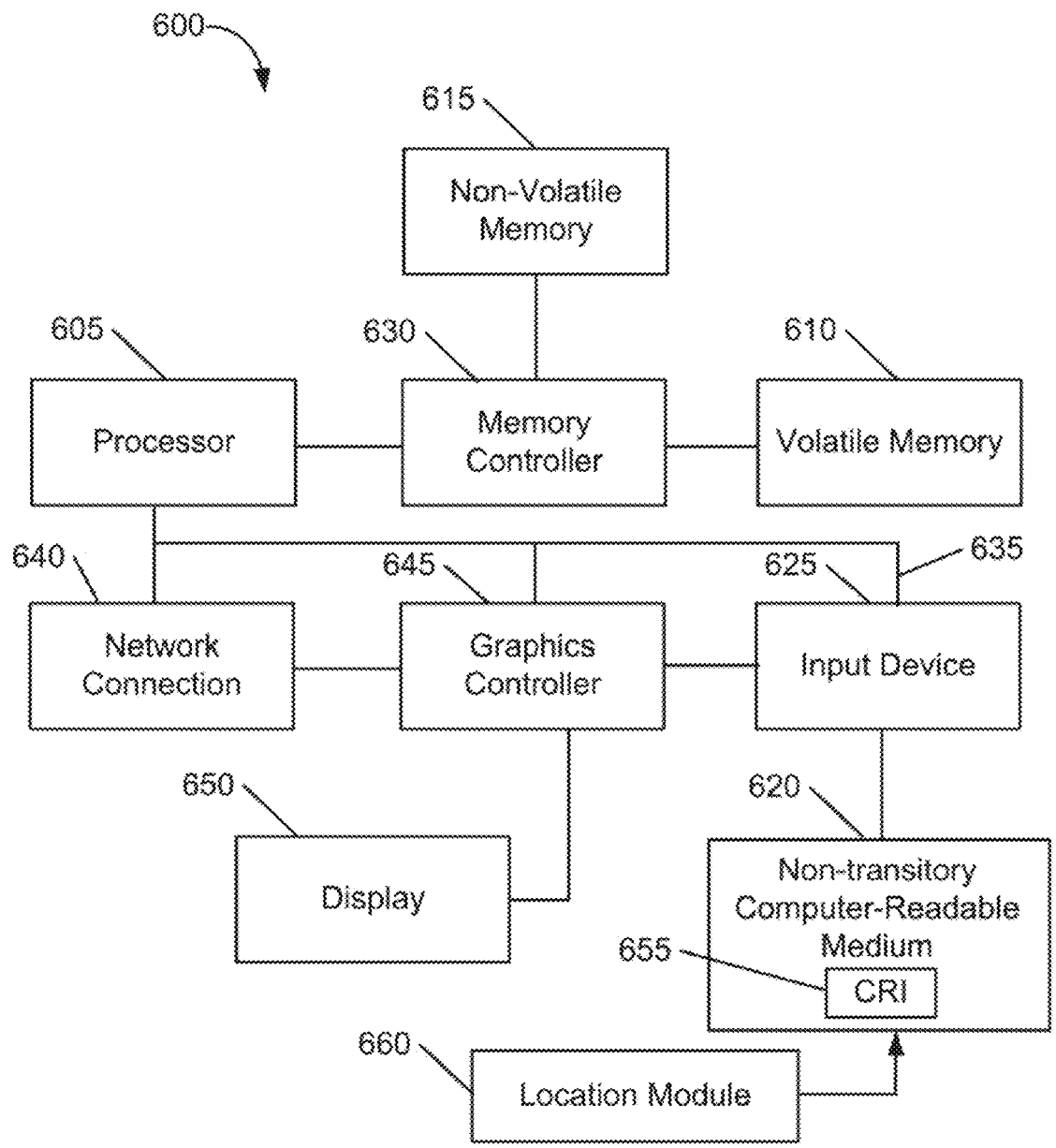
FIG. 6 is a block diagram of an example computing system for hosting the location module of FIG. 2 according to the present disclosure.

As described above, the location module used by the location owner/service provider to provide the location authentication service to users may be implemented in hardware, software, or a combination of both. Referring now to FIG. 6, a block diagram of an example computing system for hosting the location module of FIG. 2 according to the present disclosure is described. The computing system 600 (e.g., a desktop computer, a laptop, a multi-core processing system, etc.) can include a processor 605 and memory resources, such as, for example, the volatile memory 610 and/or the non-volatile memory 615, for executing instructions stored in a tangible non-transitory medium (e.g., volatile memory 610, non-volatile memory 615, and/or computer readable medium 620) and/or an application specific integrated circuit ("ASIC") including logic configured to perform various examples of the present disclosure.

A machine (e.g., a computing device) can include and/or receive a tangible non-transitory computer-readable medium 620 storing a set of computer-readable instructions (e.g., software) via an input device 625. As used herein, the processor 605 can include one or a plurality of processors such as in a parallel processing system. The memory can include memory addressable by the processor 605 for execution of computer readable instructions. The computer readable medium 620 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 615 can be a local or remote database including a plurality of physical non-volatile memory devices.

The processor 605 can control the overall operation of the computing system 600. The processor 605 can be connected to a memory controller 630, which can read and/or write data from and/or to volatile memory 610 (e.g., RAM). The memory controller 630 can include an ASIC and/or a processor with its own memory resources (e.g., volatile and/or non-volatile memory). The volatile memory 610 can include one or a plurality of memory modules (e.g., chips). The processor 605 can be connected to a bus 635 to provide communication between the processor 605, the network connection 640, and other portions of the computing system 600. The non-volatile memory 615 can provide persistent data storage for the computing system 600. Further, the graphics controller 645 can connect to a display 650.

Each computing system 600 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one processor or more than one processor, such as in a parallel processing arrangement.

The control circuitry can have a structure that provides a given functionality, and/or execute computer-readable instructions that are stored on a non-transitory computer-readable medium (e.g., the non-transitory computer-readable medium 620). The non-transitory computer-readable medium 620 can be integral, or communicatively coupled, to a computing device, in either a wired or wireless manner. For example, the non-transitory computer-readable medium 620 can be an internal memory, a portable memory, a portable disk, or a memory located internal to another computing resource (e.g., enabling the computer-readable instructions to be downloaded over the Internet).

The non-transitory computer-readable medium 620 can have computer-readable instructions 655 stored thereon that are executed by the processor 605 to implement a location module 660 according to the present disclosure. The non-transitory computer-readable medium 620, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 620 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular computing system configuration, such as computing system 600.

Those of skill in the art would further appreciate that the various illustrative modules and steps described in connection with the embodiments disclosed herein may be implemented as electronic hardware, computer software, or combinations of both. For example, the example steps of FIGS. 4-5 may be implemented using software modules, hardware modules or components, or a combination of software and hardware modules or components. Thus, in one embodiment, one or more of the example steps of FIGS. 4-5 may comprise hardware modules or components. In another embodiment, one or more of the steps of FIGS. 4-5 may comprise software code stored on a computer readable storage medium, which is executable by a processor.

To clearly illustrate this interchangeability of hardware and software, various illustrative components, blocks, modules, and steps have been described above generally in terms of their functionality (e.g., the location module 230). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method for authenticating a user's location in a femtocell-based network, comprising:
    associating, by a processor of a service provider, the user to a femtocell connected to a connection point in the network;
    providing, by the processor of the service provider, an indication of the user's location to a remote user;
    monitoring, by the processor of the service provider, a characteristic of a connection between the femtocell and the connection point~
    wherein the connection comprises a traffic signature unique to the remote user, identifiable only by the remote user, and located in the connection between the femtocell and the connection point; and upon receiving a request from the remote user, providing the monitored characteristic from the service provider to the remote user to verify the user's location based on the traffic signature.

2. The method of claim 1, wherein the user is located within a range of the femtocell.

3. The method of claim 1, wherein providing an indication of the user's location to a remote user comprises communicating with the remote user.

4. The method of claim 1, wherein communicating with the remote user comprises engaging in a communication with the remote user selected from a group consisting of a voice call, a text message, an e-mail, and a data communication.

5. The method of claim 1, wherein monitoring a characteristic of a connection between the femtocell and the connection point comprises monitoring a bandwidth of the connection.

6. The method of claim 1, further comprising displaying the monitored characteristic to the remote user.

7. The method of claim 1, further comprising receiving a communication from the remote user after providing the monitored characteristic to the remote user.

8. The method of claim 7, wherein the communication is reflected in the monitored characteristic.

9. A method for authenticating a user's location in a femtocell-based network, comprising:
  receiving at a remote user, from a service provider, an indication of a user's location associated with a femtocell connected to a connection point in the network;
  upon receiving the indication of the user's location, accessing the service provider, by the remote user, to receive a monitored characteristic of a connection between the femtocell and the connection point;
  engaging, by the remote user, in a communication with the user~
  wherein engaging comprises placing a traffic signature unique to the remote user and identifiable only by the remote user in the connection between the femtocell and the connection point; and
  verifying, by the remote user, that the communication received from the user corresponds to the monitored characteristic received from the service provider to authenticate the user's location based on the traffic signature.

10. The method of claim 9, wherein the user is located within a range of the femtocell.

11. The method of claim 9, wherein engaging in a communication with the user includes engaging in a communication selected from a group consisting of a voice call, a text message, an e-mail, and a data communication.

12. The method of claim 9, wherein monitoring a characteristic of a connection between the femtocell and the connection point comprises monitoring a bandwidth of the connection.

13. The method of claim 9, wherein monitoring a characteristic of the connection comprises monitoring the characteristic in a display.

14. The method of claim 9, wherein monitoring a characteristic of the connection comprises verifying the traffic signature in the monitored characteristic.

15. The method of claim 9, further comprising identifying the traffic signature in a packet sent to the user.

16. The method of claim 9, further comprising employing a detection mechanism to authenticate the traffic signature in the monitored characteristic.

17. A non-transitory computer readable medium having instructions stored thereon, wherein the instructions are executable by a processor of a service provider to: associate the user to a femtocell connected to a connection point in a network; provide, from the service provider to a remote user, an indication of the user's location; monitor a characteristic of a connection between a femtocell and a connection point~
  wherein the connection comprises a traffic signature unique to the remote user, identifiable only by the remote user, and located in the connection between the femtocell and the connection point;
  receive a request for the monitored characteristic from the remote user; and
  provide the monitored characteristic from the service provider to the remote user for verifying a user's location associated with the femtocell based on the traffic signature.

18. The non-transitory computer readable medium of claim 17, wherein the monitored characteristic comprises a bandwidth of the connection between the femtocell and the connection point.

19. The non-transitory computer readable medium of claim 17, wherein the request comprises a request for a web page.

20. The method of claim 9, further comprising identifying the traffic signature in a packet header of a packet sent to the user by a unique code in a field of the packet header.

* * * * *